United States Patent

[11] 3,618,928

[72] Inventor Paul H. Taylor
3877 East River Road, Grand Island, N.Y. 14072
[21] Appl. No. 850,269
[22] Filed Aug. 14, 1969
[45] Patented Nov. 9, 1971
Continuation of application Ser. No. 619,531, Feb. 27, 1967, now abandoned.

[54] RESILIENT CYLINDER LIQUID SPRING
5 Claims, 25 Drawing Figs.
[52] U.S. Cl. .................................................. 267/65,
188/315, 188/317, 188/322, 213/43, 267/124
[51] Int. Cl. .................................................. B60g 13/08,
F16f 5/00, F16f 9/10
[50] Field of Search .......................................... 213/43;
267/126, 127, 124, 125, 8, 35, 63, 64, 65, 120;
280/481; 188/88.501, 88.505, 88.508, 96.5,
96.51, 96.52, 96.7, 315, 317, 322

[56] References Cited
UNITED STATES PATENTS

| | | | |
|---|---|---|---|
| 2,500,459 | 3/1950 | Hoover et al. | 267/127 |
| 2,785,887 | 3/1957 | Taylor et al. | 267/126 |
| 2,904,328 | 9/1959 | Williams | 267/126 |
| 3,194,415 | 7/1965 | Rasmussen | 267/126 X |
| 3,204,945 | 9/1965 | Taylor | 267/127 X |
| 3,235,287 | 2/1966 | Hamm | 280/481 |
| 3,369,674 | 2/1968 | Carle | 213/43 |
| 1,529,235 | 3/1925 | Bechereau | 188/88 |
| 2,538,375 | 1/1951 | Montgomery | 188/88 |
| 2,751,216 | 6/1956 | Taylor | 267/124 |

Primary Examiner—Arthur L. La Point
Assistant Examiner—Howard Beltran
Attorney—Hume, Clement, Hume & Lee ABSTRACT: A low pressure operating liquid spring and/or shock absorber capable of operating under varying impact loads is provided for use in suspension systems for passenger vehicles and the like.

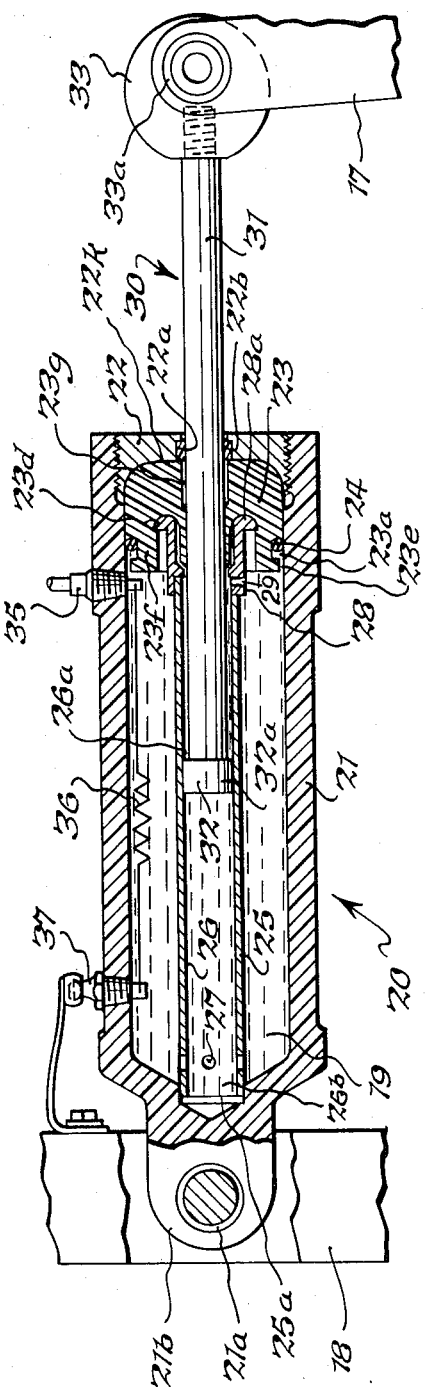
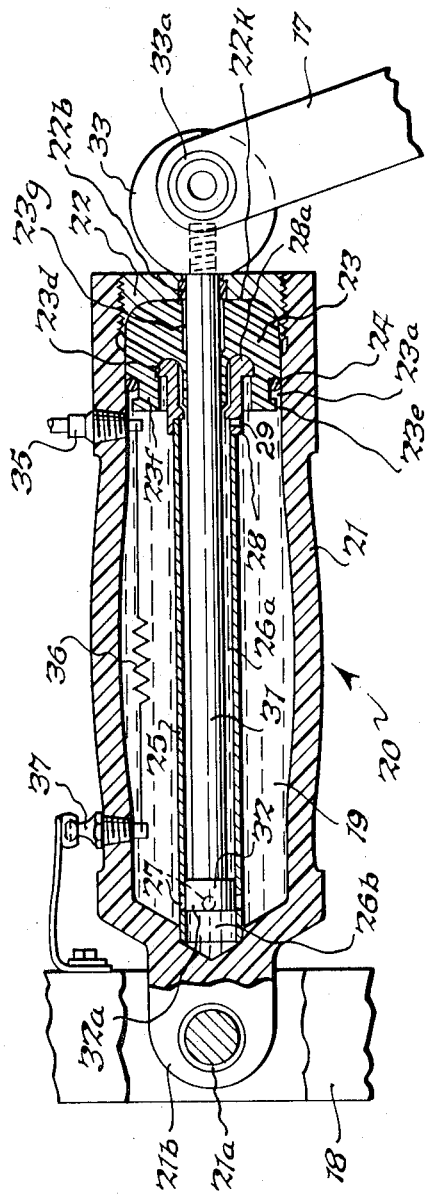

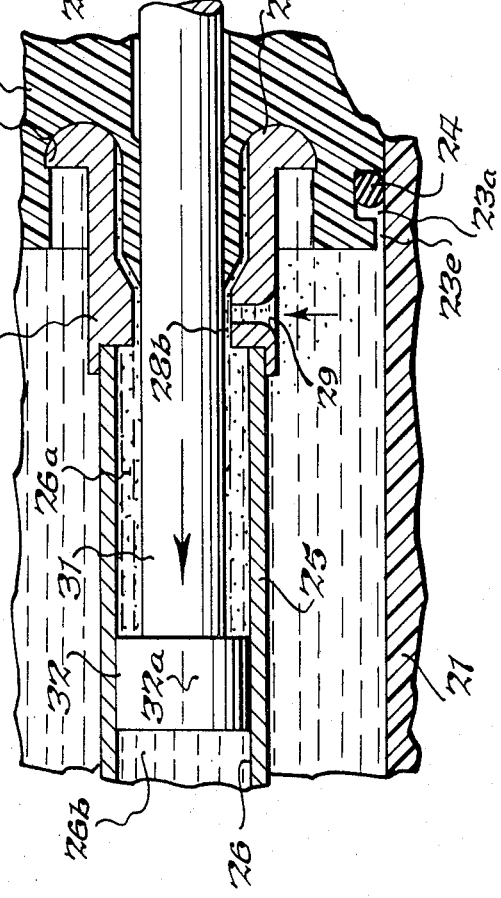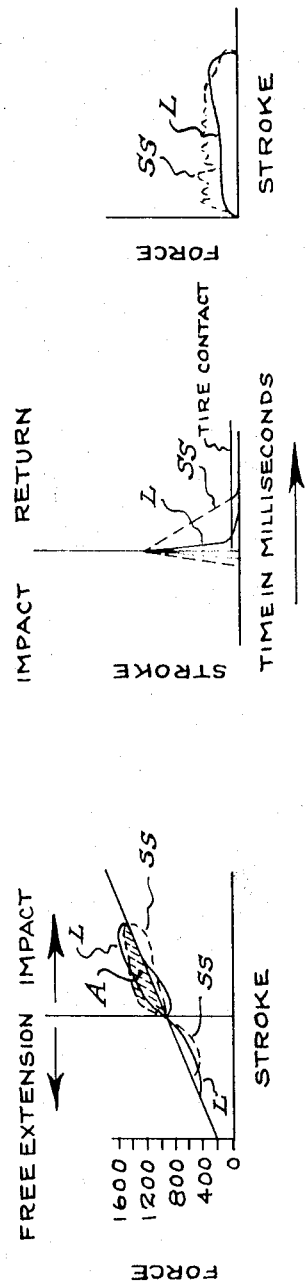

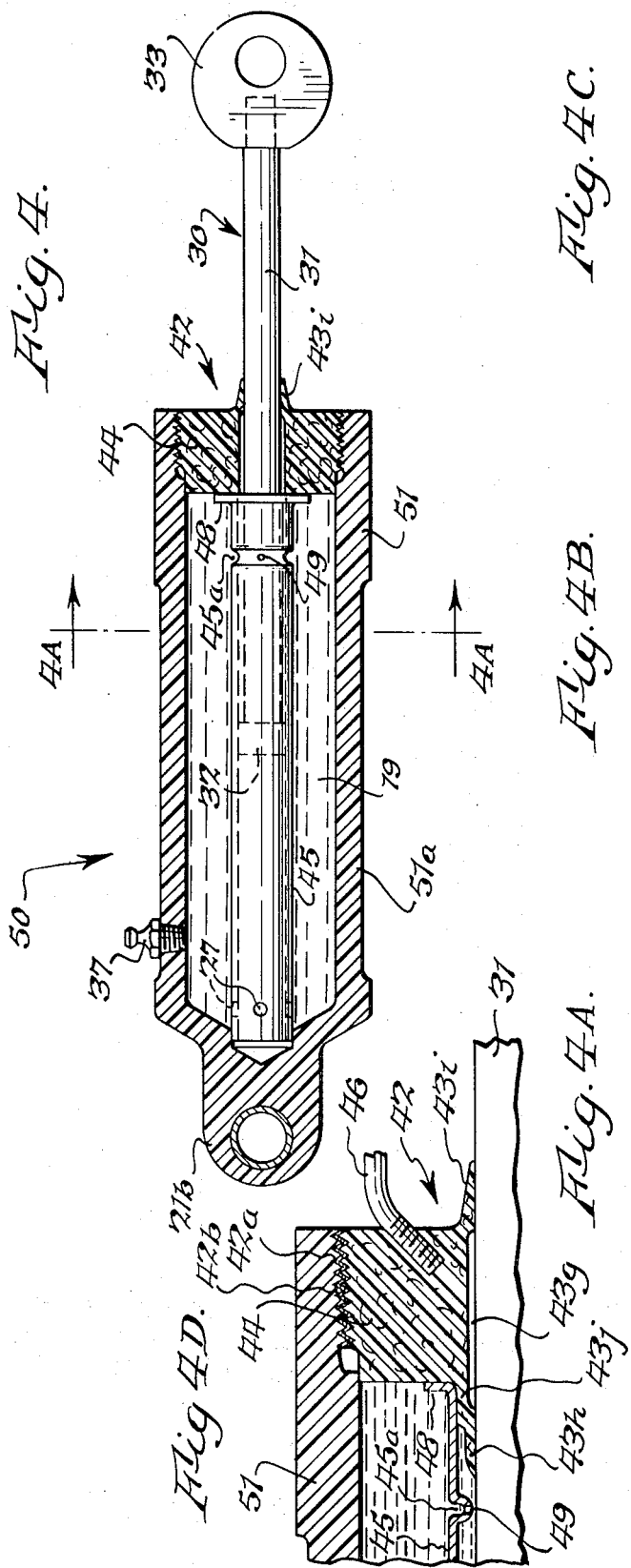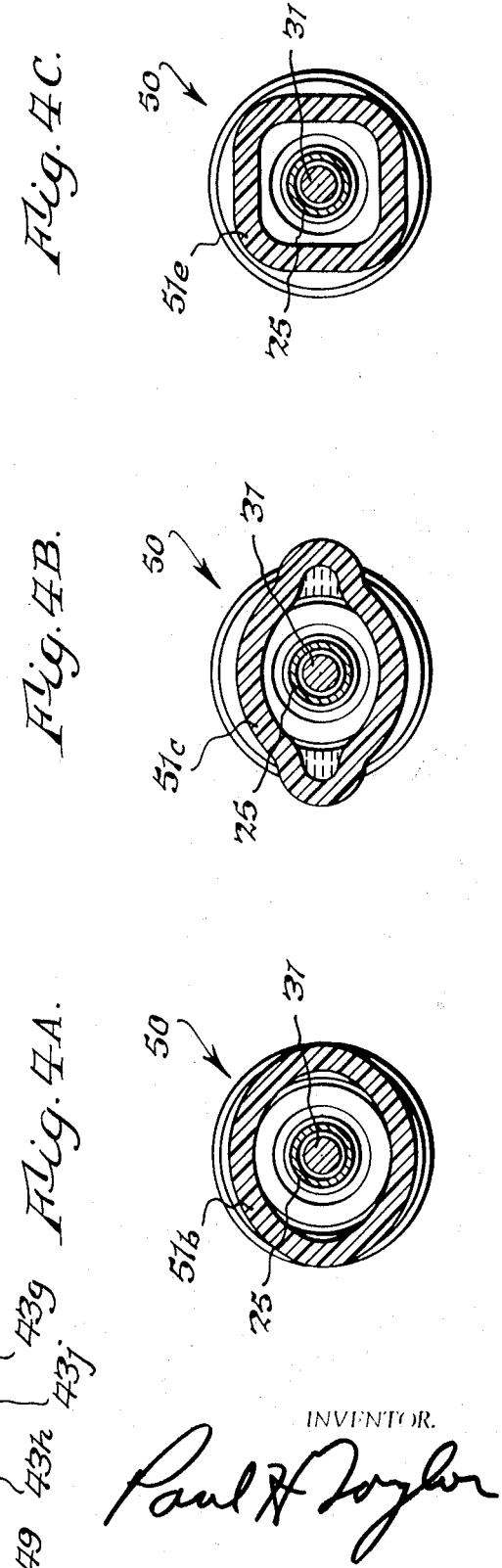

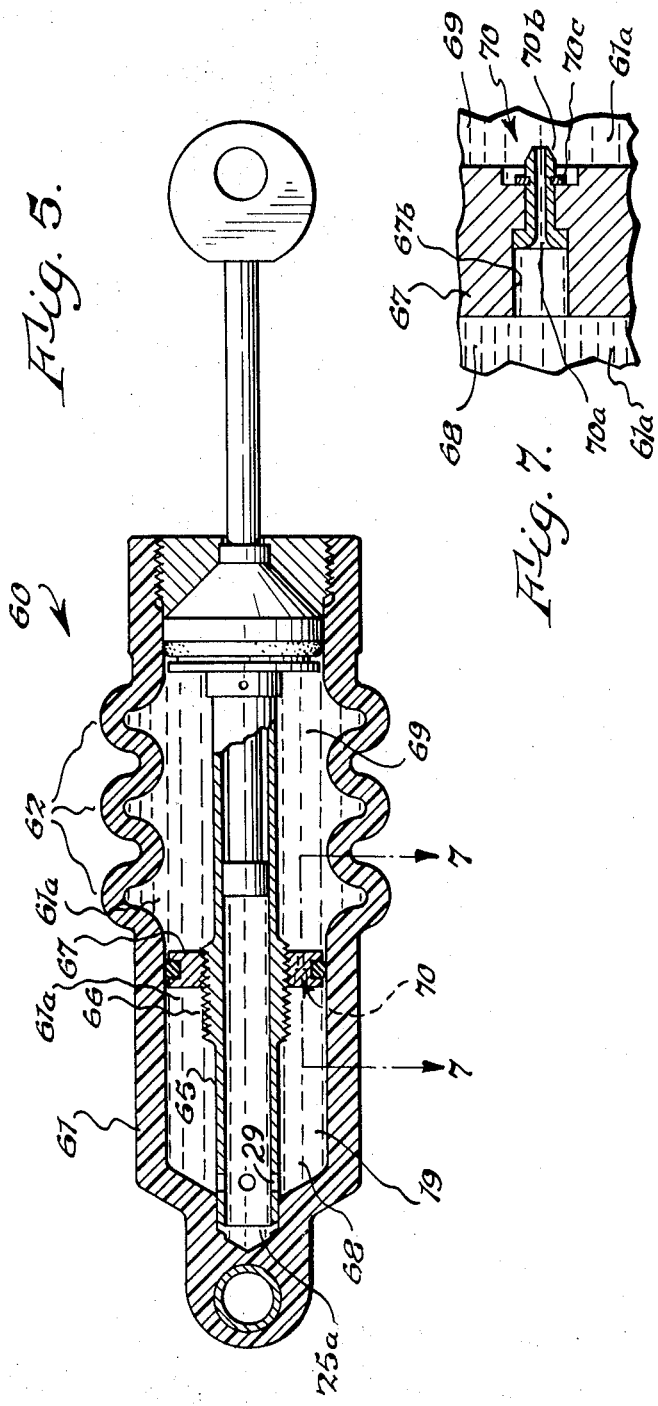
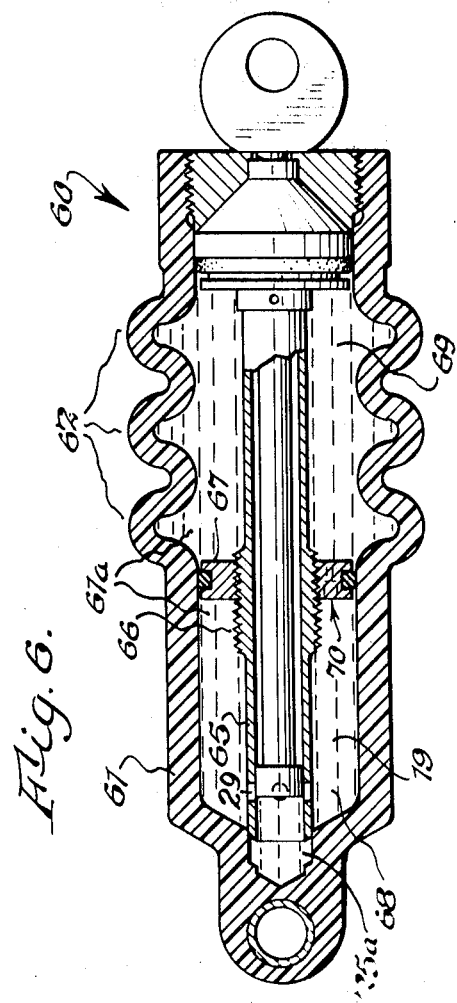

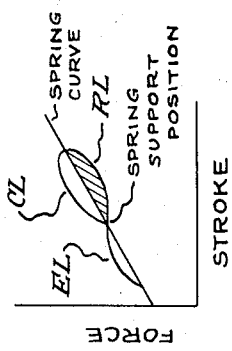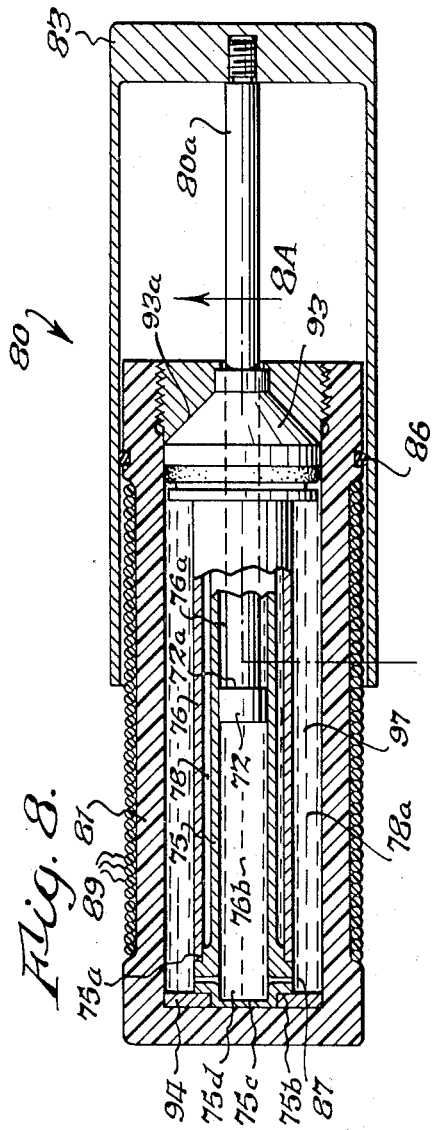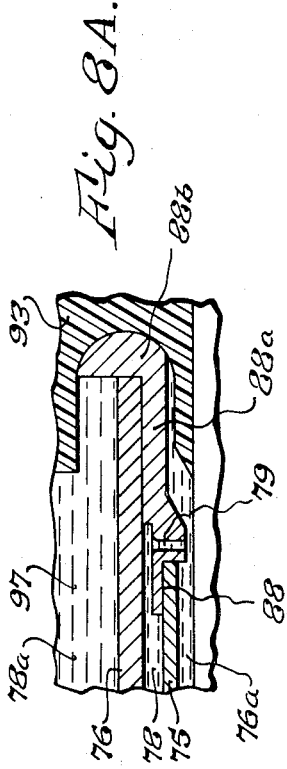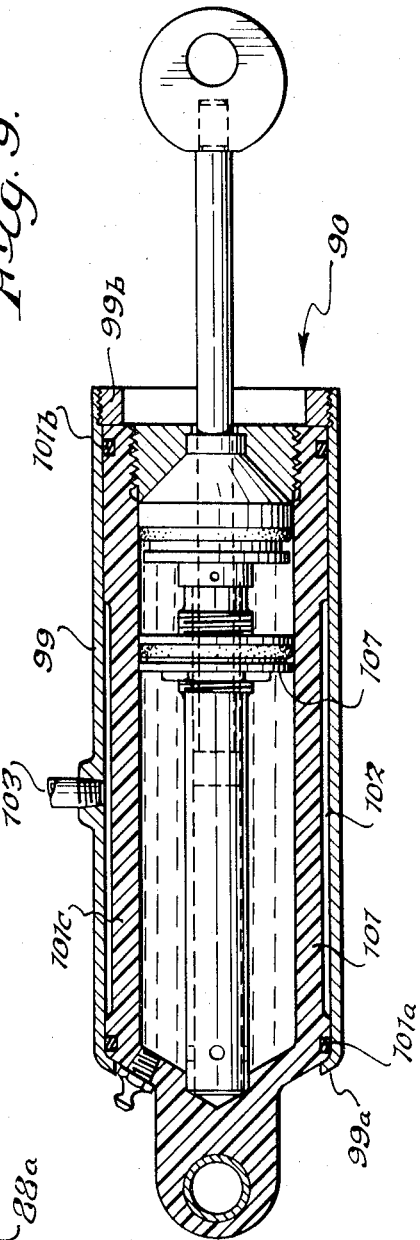

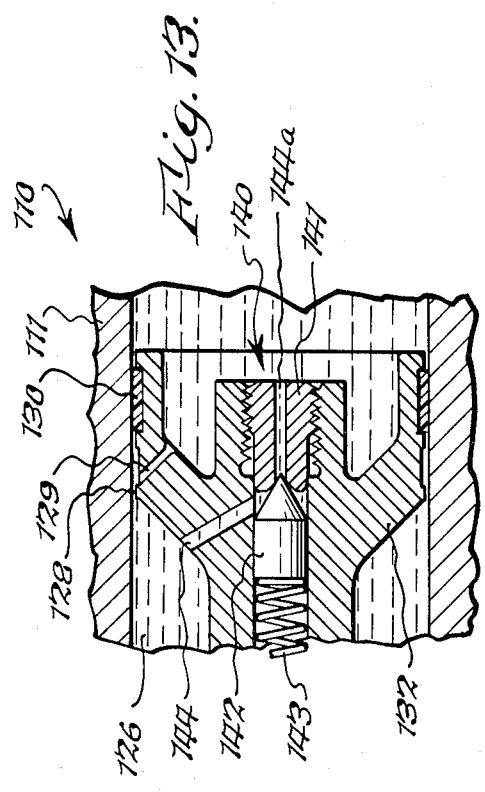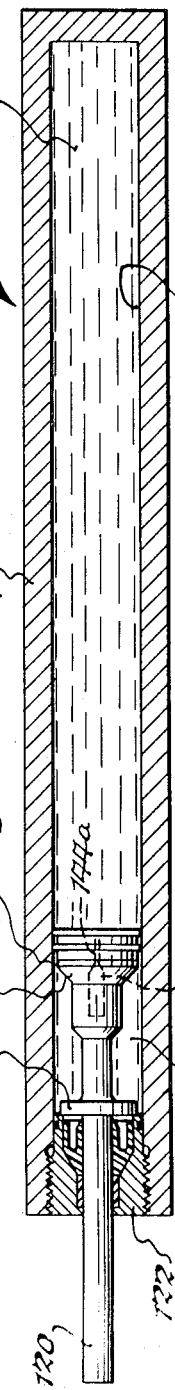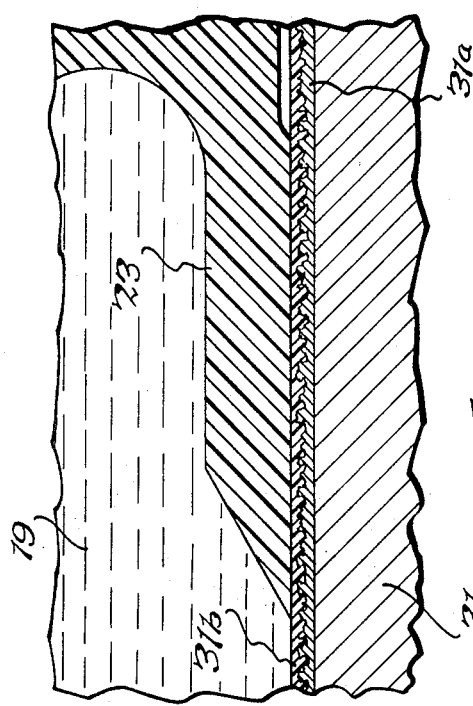

INVENTOR.
Paul H. Taylor

RESILIENT CYLINDER LIQUID SPRING

CROSS-REFERENCE TO RELATED APPLICATION

This application is a continuation of my earlier copending application Ser. No. 619,531, filed Feb. 27, 1967, and now abandoned.

BACKGROUND OF THE INVENTION

This invention relates generally to energy storage devices and more particularly deals with low pressure liquid springs and shock absorbers which function well under varying impact loads.

Conventional vehicle suspensions and pressure responsive shock absorbers used in automobiles and the like are designed primarily to insure smooth rides. In many instances, however, vehicle control is sacrificed because as a vehicle wheel is impacted upward from a bump, the spring and shock resistance, which is lowered to accommodate smooth rides, causes a condition in which minimum stored energy is available in the compressed spring to restore the wheel to the pavement. In short, traditional vehicle suspensions allow the wheel to be driven further and returned to the pavement more slowly.

Interestingly, a number of design changes have been undertaken to obviate this deficiency. For example, lightened spring structures and variable spring rate type springs have been employed in vehicle suspension systems. Other designs changes have included torsion and antiroll bars which add to spring rate upon excitation of vehicle wheels.

In addition many existing vehicle suspension systems are unable to differentiate between a wheel returning from impact and a hole into which the vehicle wheel may drop. Ideally, a vehicle wheel as it reaches a hole in the pavement should drop immediately to support the vehicle and then return from impact in a dampened fashion to avoid wheel rebound.

Despite the inherent potential of liquid springs in vehicle suspension system applications, to date, such liquid springs have been used primarily in military systems where high shock force requirements are desired. In fact, liquid springs have heretofore been considered unsuitable for the low cost, low pressure, smooth ride suspension systems required in passenger vehicles. Some major problems in adapting liquid spring systems to passenger vehicle use have included the high hysteresis and friction characteristics of such springs, their inability to adapt to vehicle temperature variations, and the extremely high operating pressures required for such springs.

SUMMARY OF THE INVENTION

According to this invention, a liquid spring has now been developed for use in passenger vehicle suspension systems. This liquid spring system includes a cylinder, a reciprocable piston extending into the cylinder and having dual sections thereon of varying cross sections, a compressible liquid which fills the cylinder, and a flow limiting assembly which limits the flow of compressible liquid around the smaller of the dual sections.

Among the advantages of the new liquid springs of this invention are (1) a built-in dual rate suspension spring having a high spring rate proportional to wheel impact, (2) the ability to differentiate between and adjust for wheel suspension over a hole in the pavement and wheel return, (3) the low pressure operating characteristics of such liquid springs which permit the use of aluminum, plastic or deflectable steel cylindrical shells in the spring, (4) the use of elastic cylinders to reduce the volume of compressible liquid required in the spring, (5) the markedly reduced effect of temperature variations on such liquid springs accomplished by means of the aluminum and plastic cylindrical bodies which can be used therein, (6) the inherent limit load characteristics of the liquid spring at any impact velocity which results from the dual-spring rate character of such springs, (7) the treatment of the piston rod and dashpot head of such springs to provide reduced friction losses, (8) the wide variability in use of such springs, for example, in train buffers and passenger vehicles, (9) the reduced space requirements for such springs, and (10) the ability of such springs to change from soft to stiff springs according to the impact absorbed by the spring.

These and many other advantages of this invention are more fully described herein. However, it should be recognized that some of the advantages characteristics of this invention have been accomplished largely through the application of fluid amplifier techniques to liquid springs in combination with the viscous characteristics of certain liquids such as flourocarbons, high viscosity oils and silicons used therein.

BRIEF DESCRIPTION OF THE DRAWINGS

This invention will be more readily understood by reference to the following drawings, in which:

FIG. 1 is an elevational view partially in cross section of one embodiment of the liquid spring shock absorber of this invention in an uncompressed position;

FIG. 2 is an elevational view also partially in cross section showing the shock absorber in a fully compressed position;

FIG. 3 is an elevational view of a portion of the shock absorber showing the direction of fluid flow when the shock absorber is in compression;

FIG. 3A is an elevational view of the detailed portion of the shock absorber shown in FIG. 3 indicating the direction of fluid flow when the shock absorber is rebounding from compression;

FIG. 3B illustrates the operational characteristics of a conventional shock absorber and the liquid spring shock absorber of this invention on a graph plotting force versus piston stroke;

FIG. 3C also illustrates the operational characteristics of a conventional shock absorber and the liquid spring shock absorber of this invention in graphic form;

FIG. 3D illustrates the operational characteristics of a conventional shock absorber and the liquid spring shock absorber of this invention in graphic form;

FIG. 4 is a cross-sectional view of another embodiment of the liquid spring shock absorber of this invention;

FIG. 4A is an end view of one form of elastic wall deflection which occurs in the liquid spring shock absorbers of this invention;

FIG. 4B is an end view of another form of elastic wall deflection which takes place in the liquid spring shock absorbers of this invention;

FIG. 4C is an end view of a third type of elastic wall deflection which takes place in the liquid spring shock absorbers of this invention;

FIG. 4D is an enlarged cross-sectional view of a liquid spring shock absorber showing an end cap and seal in detail;

FIG. 5 is an elevational view of a triple rate liquid spring shock absorber in an uncompressed state in which a plurality of corrugations are formed on the circumference of the cylinder wall;

FIG. 6 is an elevational view of the same liquid spring shock absorber shown in FIG. 5, except that the absorber is shown in a compressed state;

FIG. 7 is a cross-sectional view taken through line 7—7 of FIG. 5 showing in detail the stepping bore which divides the cylinder into separate chambers;

FIG. 8 is an elevational view in cross section of a liquid spring shock absorber having a plastic cylinder wound with monofilaments;

FIG. 8A is an enlarged sectional view of the liquid spring shock absorber illustrated in FIG. 8, taken through line 8A—8A of FIG. 8;

FIG. 9 is an elevational view in cross section of the hard spring shock absorber shown in FIG. 8, before compression;

FIG. 10 is a graphic illustration of the operating characteristics of the liquid spring shock absorber shown in FIG. 8;

FIG. 11 is an enlarged detail view of a portion of the piston rod and seal gland for the liquid spring shock absorbers of this invention;

FIG. 12 is an elevational view in cross section of a liquid spring shock absorber having a piston head provided with orifices;

FIG. 13 is an enlarged cross-sectional view of the piston head shown in FIG. 12;

FIG. 14 is a graphic representation of the shock absorber shown in FIGS. 12 and 13;

DESCRIPTION OF THE PREFERRED EMBODIMENT

Figure 15:
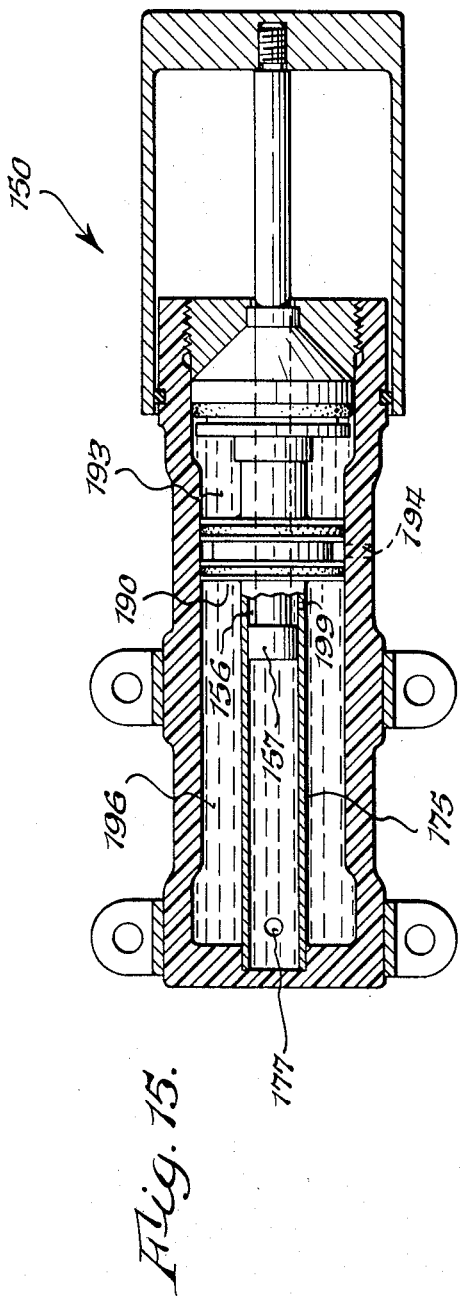
FIG. 15 is an elevational view in cross section showing another embodiment of the shock absorber devices of this invention.

In FIGS. 1, 2, 3 and 3A one embodiment of the liquid spring shock absorber of this invention is shown generally at 20. The shock absorber 20 is provided with a pair of end fittings 21B and 33 which serve to attach absorber 20 to a vehicle structure 17 and 18 by means of pins disposed through rubber bushings 21 and 33A.

In FIG. 1, for example, the liquid spring shock device 20 is shown in its normal uncompressed state. In contrast, FIG. 2 shows the liquid spring shock device 20 in a fully compressed state in which the elasticity of cylinders 21 is employed as a compression stop for the shock absorber.

In general, liquid spring assembly 20 consists of a cylinder 21, a metallic inner dual rate spring tube 25 disposed within cylinder 21, a piston assembly 30 reciprocal in spring tube 25 and a plastic seal assembly 23 which is disposed between cylinder 21 and piston assembly 30. More particularly, cylinder 21 is desirably constructed from either a creep resistant, high strength plastic or a plastic having either cloth, monofilament fibers or whiskers dispersed therein. Preferably TFE fibers or aluminum oxide whiskers having elastic, thermal properties comparable to the base plastic are used to structurally reinforce cylinder 21.

Cylinder 21 is capped by threaded cap assembly 22 having stepped bore 22a with retains liquid 19, seal 23, antiextrusion ring 22b, retainer 28 and tube 25 all within cylinder 21. The seal element 23 utilized an "O" Ring 24 disposed in seal groove 23a for sealing the high deflecting wall of cylinder 21. A clearance 23e is provided to assure that liquid 19 energized seal 24. Seal 23 is provided with a flat bottom at 22k, to avoid the hysteresis generated by angled seals of earlier devices. It should be understood that TFE coated pistons 31 and TFE seals having contact seal lengths greater than two times piston diameter or a minimum of ½ inch length of leakage path are considered a desirable feature of this invention whether leak-free or weepage sealing is desired.

Utilization of plastic-walled vessels and plastic coating 31b of rod 31 with recessed seal 23 and plastic coating 23a of piston head 32 in combination with a liquid having at least 3 percent by volume low viscosity siloxane miscible in heavy siloxane provides controlled weepage and accomplishes low friction. Recess 23d acts to restrain retainer and tube 25 in juxtaposition to seal 23 for movement therewith as plastic cylinder 21 works elastically as shown in FIG. 2.

The piston rod 31 of piston assembly 30 has a very slightly enlarged piston head 32 which is generally 15 to 20 percent larger in area than the diameter of the piston rod 31. The piston head 32 resembles the dashpot head of a conventional shock and serves as a dual rate liquid spring piston. Unlike a shock dashpot head in function, piston head 32 must have a comparatively close fit to bore 26. Accordingly piston head 32 is preferably coated with a plastic surface 32a such as polyamide or TFE by the usual approved coating methods known in the art. While this invention provides a slight weepage by this close fitting plastic surfaced piston head 32, the weeping surface may also be a TFE sealing ring or other low friction means of a more sealed nature where hysteresis is not critical. This construction is primarily a weeping scaling configuration which is defined as one that will weep slightly on dynamic excitation for lubricity and low friction but which has close fit due to the plastic coating prevents excessive leakage. Because of this tight fit, it will remain in a relatively sealed condition when maintained static but will weep slightly only on excitation to provide lubricity and low friction. This is an extremely important function of this device in that leakage and friction must both be low and it is primarily the function of the piston head 32 to bore 26 in relation to the volume in the entire cylinder 21 and its rebound area at 26a in relation to the orifice holes 29 from which the novel static and dynamic action of this invention evolves. Since piston head 32 is small, leakage is very critical to a precise dual spring rate function.

To achieve the proper weepage of the piston head and seal so as to lower friction to acceptable levels the plastic coated head 32 and plastic coated rod 31, as shown in FIG. 11, are used in combination with a hybrid liquid 19 which contains at least 90 percent of heavy silicones of 1,000 centistoke viscosity and under 10 percent by volume of the extremely light molecular weight silicones of 0.06 centistoke viscosity, one being miscible in the other. Very slight weepage of 0.65 centistoke liquid, under pressure, lubricates the seal 23 and head 32 reducing friction further.

It should be noted that the various spring rebound and shock characteristics of the spring shock devices of this invention can be varied up to 50 percent by the combinations of liquids providing viscosities of the mixed liquids described so that a standard spring shock might fit several weights of vehicles merely by changing the liquid constituents and support pressures. This, of course, is desirable for insuring both low manufacturing costs and tailoring shock forces to match particular requirements.

A multirate aspect of this device is obtained by means of the deflection caused in cylinder 21. Because of the large diameter of the cylinder 21 and the substantial deflection of the deflectable cylinder 21, which provides a substantial part of the total energy capacity of the device, the spring unit of this invention operate at low pressures to provide the effect of a much larger volume of compressible liquid 19 at low pressure as the same volume of liquid 19 in a low deflection cylinder at very high pressures. This reduction in liquid volume plus low costs of the cylinder reduces overall cost and space requirements in a vehicle. Because of this large cylinder deflection, it is preferred that seal 23 be modified as to sealing the outer lip 23f by the introduction of a seal groove 23a using a conventional "O" Ring on flexible lip 23f. In this configuration, the tube end and retainer 28 have a large annular formed section 28a closely conforming to the seal 23 and thus distributes its bearing load on shock application thereto so as not to extrude the TFE seal upon excessive liquid pressure on rebound.

Specifically, the deflections due to the elasticity of cylinder 21 at pressures of 2,000 p.s.i. or the like using, for example, a cylinder constructed from acetals, polyamides, or the polycarbonates will provide up to 70 percent of the spring resilience or energy storage for the device while compressible liquid 19 will provide 30 percent of the energy storage as piston rod assembly 30 is compressed. It should also be noted that other liquid elements of higher compressibility can be also used to provide approximately 50 percent of the available displacement for the piston.

In FIG. 2 for example the deflection of cylinder 21 due to the elasticity of the wall of the cylinder 21 of liquid spring 20 is shown in exaggerated fashion. This deflection provides a substantial amount of the resilient energy from the strain energy of the mechanical stretch of the cylinder in combination with that of normal liquid compressibility of liquid 19. It also serves as an end bump stop to lessen bottoming impacts. It will be noted that end clearance 25a for tube 25 is used to permit this movement of cylinder 21. Tube 25 moves with seal 23 due to the engagement of recess 23d with retainer 28. The resilient energy feature of this invention can also be obtained by cylinder 51 is made of metal such as is shown in spring 50 of FIGS. 4, 4A, 4B and 4C or in spring 60 of FIGS. 5 and 6.

By the use of a plastic cylinder which has a coefficient of thermal expansion more closely matched to that of a highly compressible liquid than a conventional metal cylinder 19, a reduction in height of the vehicle from temperature differences of 50° F. or the like will not adversely affect suspension. Utilizing the plastic cylinder reduces the thermal expansion significantly. In addition, a further benefit can be realized by permitting plastic cylinder 21 to utilize the thermal energy from electrical resistance 36 therein, since plastic elements generally are better insulators of temperature than metal walls previously used.

Through the use of plastics, it is feasible to put this resistance 36 in the cylinder itself, as shown in FIGS. 1 and 2, the plastic member being an electrical and thermal insulator. Application of electricity to insulated cylinder is made through penetrating contact 35, which distributes current to resistance wire 36. Resistance wire 36 is connected to grounded filler plug 37 which can have wired metal contact to ground. When the current is applied to resistance unit 36, it heats the liquid 19 therein and causes the vehicle suspension 20 to extend by virtue of the fact that the volume at constant pressure has been increased by heat. The cylinder 21 will not heat as quickly so the vehicle will raise fairly rapidly depending upon the horsepower generated by the resistance unit.

In practice, thermal losses due to use of plastic cylinder 21 will be less than with metal so the vehicle will be rapidly raised. When additional weight has been added to the car, heat is applied through resistance 36 because the pressure and volume are increased to support the vehicle at a given height. In driving such a suspension using metal cylinders at about 90° F., it was found that the heat dissipation through the wall, once height was set, was matched by the energy dissipation that takes place in stroking the unit. Thus height will generally maintain itself and be properly stable at high temperatures. Since the plastic cylinder 21 compensates fairly well for temperature only extreme temperatures must be compensated for by electrical energy or for leveling or raising the vehicle for other purposes.

It is important to note that with the shock absorber of this invention, since less shock energy is dissipated, much less thermal energy is required to be dissipated. Use of the antifriction plastic coating 32a of FIG. 1 and 31b of FIG. 11 is also useful in lowering frictional heat and controlling height.

It will be observed in the devices of this invention that with the exception of the very special thermal shock requirements of the device of FIG. 13, no pressure responsive valves are utilized anywhere and the impact orifice holes 27 in tube 25 are not restrictive except for extreme high impact velocities.

By way of illustration at the unique characteristics of this invention, if one had a liquid spring, having a piston area "X" equal to the enlarged area 32 of the piston 30, one would in effect have a stiffer liquid spring than if one considered for instance just the rod section 31 having an area "Y" 20 percent smaller than "X." A piston rod 31 having an area of 0.15 square inches using a volume of 30 cubic inches for cylinder 21 provides spring rate of approximately 120 pounds per inches at support height. Now considering that the dual rate piston head 32 is 20 percent larger in cross-sectional area than the piston rod 31, it should be clear that the stroking of piston head 32 having an area of 0.18 provides a spring rate of approximately 150 pounds per inches.

As shown in FIG. 3B, the result of transposition of spring energy for energy dissipation as shown in Line L is that on a 4 inch stroke of the suspension, the energy conserved for increasing wheel acceleration back to the pavement is 4 in ×30 lbs. or 120 inch lbs. of added energy for wheel return. Since soft vehicle spring rate only provides 120 lbs. per inch the normal (out) energy of return is 480 inch lbs. from which shock absorption in the conventional system (see dotted Line SS and shaded area A or lost energy converted to heat) subtracts 240 inch lbs. so 50 percent or 240 inch lbs. is all that is available for wheel restoration. However, wheel return using the shock absorber devices of this invention is 480 inch lbs. plus 120 inch lbs. due to high spring rate, resulting in a total of 600 inches for wheel return or 250 percent more energy available to restore the wheel than with conventional suspension while "L" denotes wheel restoration the liquid spring. It should be noted that this added energy is proportional to wheel impact velocity and energy input providing progressively greater restoring forces in proportion to what is required. This invention can be used to provide a much softer vehicle ride by reducing spring rates with the same rates with the same wheel return velocity or just by substituting systems (as shown on FIGS. 3 and 3A) the wheel is restored in 1/5 the time of the conventional suspension with the same spring rate in both systems.

As the wheel and tire return to the pavement at tire contact line shown in line L FIG. 3C the wheel has actually less velocity at impact (as shown by the slope of line "L") prior to tire contact as compared with line SS. As proof of this in actual tests at 50 m.p.h. the tire and wheel were observed to oscillate 7 times after contacting the road in the conventional suspension system but in the liquid spring suspension L the rebounds were only 3½ thus providing better control with identical force and ride in the vehicle.

It should also be noted that in practice a little less than this theoretical energy is available because instrumentation shows a pressure reduction of up to 500 p.s.i. in chamber 26a and a pressure increase in 26b of approximately 500 pounds on impact for a 2 inch excitation at high speed. This reduction of 26a is caused by evacuation of liquid in the chamber resulting from the sudden velocity surge of piston 31. Pressure increase in 26b is due to piston head 32 reducing spring volume suddenly by its displacement. This is no danger that the chamber 26a will become completely evacuated so as to have no rebound control since even 500 p.s.i. from 2,000 support pressure still leaves 1,500 p.s.i. remaining.

On rebound, orificing liquid from annular chamber 26a through its plurality of sharp edged return orifices 29 having 50 percent flow coefficient provides rebound control. However, as is shown in FIG. 3 when the piston is violently accelerated in compression, a fluid amplification effect is caused by member 31. Annular orifice 28b causes liquid 19 to be entrained steadily through orifices 29 into 26a to relieve the reduced pressure in 26a. Orifice 29 has a Borda's mouthpiece configuration with 98 percent flow in this direction. This is indicated by the spacing of the liquid molecules and arrows. It should be noted that the movement of the vehicle suspension is largely a sine wave and that at the apex of the sine wave the unsprung mass of wheel and suspension are essentially at rest at the peak. At this point, the conventional suspension has a spring rate in this case of 120 pounds per inch that would be effective to accelerate the wheel back to the pavement. This then would be less the restrictive force of the rebound control of the shock absorber which in most modern cars might reduce the suspension spring rate 50 pounds per inch to say 75 pounds per inch.

Conversely using the device of this invention there is a rate of 150 pounds per inch at the apex of the sine wave to initially accelerate the wheel back to the pavement. As the wheel reaches its previous support height it starts its deceleration in proportion of the resistance of the compressibility of the liquid in 26a.

As the piston head 32 is driven outwardly on extension as shown in FIG. 3A the liquid in chamber 26a quickly compresses, pressure builds up, and the compressible liquid 19 in effect is made much more viscous as is shown in the illustration in FIG. 3A. The increased viscosity plus the Borda's mouthpiece design of the orifices 29 provides a restrictive force both proportional to the velocity and energy of the wheel return as the piston seeks its former place of rest. As the wheel extends during violent impact, liquid viscosity increases on extension automatically providing greater rebound dampening. It should be noted that the Borda's mouthpiece in the orifices 29 because of its configuration permits a normal flow into chamber 26a. However, on extension orifice 29 has a coefficient of discharge back to the cylinder from the orifice of approximately 0.50 so as to provide the restrictive effort necessary to dampen the wheel extension. Increase in viscosity of the compressible liquid 19 accentuates flow restriction. It should be noted again that in actual practice, as shown in FIG. 3C, it has been found that the liquid spring returns the wheel in 1/5 the time of a conventional suspension at 50 miles an hour yet at the same time provides less than half the rebounds as the wheel impacts the pavement. FIGS. 3C and 3D for example, show by way of curves SS for the conventional spring and shock and curves L for the liquid spring, the differences between the performance of conventional and liquid springs.

It should be noted that the configuration noted herein also differentiates between the wheel returning from the bump of impact and the wheel dropping into a hole. Actual tests with identical cars one with liquid springs and one with the car not equipped with the liquid springs showed that a car equipped with conventional springs drove violently when dropping over 6-inch ledge at high speed. As for a car equipped with liquid springs, it rode easily over the hole with scarcely a dip. This is further illustrated on the free extension side of FIG. 3B when line L extends further than line SS of the conventional suspension on free extension.

Another aspect of the device of this invention is the greater resiliency which results through utilization of elastic walls for cylinder 21 use of such elastic walls permits part of the displacement to come from the deflection of the walls. To achieve the desired wall effect with metal rather than plastic cylinders, a cylinder 51 as shown in FIG. 4, which is essentially a round cylinder having a cross section at its seal end and end wall similar to FIGS. 1 and 2, can be used. Likewise, the desired wall effect can be accomplished by means of an elliptical shaped cylinder 51b such as shown in FIG. 4A or by means of a modified ellipse 51c of FIG. 4B or square cylinder 51d in FIG. 4C. These shapes can be obtained by press working the cylinder to cause it to assume the asymmetrical shapes noted. Under internal pressure the cylinder 51 so designed will attempt to go into a perfect circular shape at 51a, 51b, 51c, or 51d in cross section seeking to restore itself to its round section with pressure and thus provide energy in the form of a mechanical spring action from extending and deflecting its walls to supplement the energy of the liquid 19 in the liquid spring.

In the enlarged sectional view of FIG. 4D, a combination end cap and seal 42 having a seal portion 43h integral with cap end 44 is illustrated. This assembly is preferably made of an acetal plastic reinforced with TFE whiskers, each whisker having the physical strength of metal and lubricity of TFE. Strengthwise, this reinforced plastic has been proven in tests to be capable of performing the function of end cap and seal 42 for the low pressure springs as shown herein. Taper threads 42a formed in seal 42 hold it to cylinder 51, and have a TFE thread sealing tape 42b applied thereto to initially provide TFE sealing at threads 42a. Spring lip 43h, seals piston rod 31, and a recess 43g is forced between integral wiper lip 43i and seal lip 43h to provide a weepage collection recess 43g which can be discharged back to a reservoir when used in a pumped leveling system through tube 46. Interference spring pressure at wiper lip 43i and seal lip 43h will assure that weepage pressure on 43g will be sufficient to induce flow to a reservoir. It should be noted that TFE whiskers actually bleed through the sealing surfaces such as at seal lip 43h, 43i, and piston 23 so that seal 43h is TFE coated therewith and with rod 31 coated sealing enhanced as described in FIG. 11.

It will be noted that high spring rate tube 45 has a rolled recess stop which forms a Borda's orifice 45a with straight orifices 49 therein and a flanged stop section 48 engaging cap seal 44 and maintained coaxial on shoulder 43j of cap seal 44. The use of acetal TFE reinforced acetal plastics to provide a seal from the integral substantial spring like intensified interference strength of seal lips 43h and 43i which is 8 times that of TFE along, while providing the low friction. TFE sealing surface of lip 43h working with the plastic coating 31a of piston rod 31 is also suitable for use. TFE reinforced acetals and coated pistons eliminate the necessity for cold flow replenishing seals. The functional characteristics of such a seal is desirable in liquid springs and a necessity on vehicle suspensions where excessive friction causes a bad ride and raises the vehicle as noted from the expanding volumes of siloxanes from temperature.

In FIGS. 5 and 6, a cylinder 61 for liquid spring assembly 60 is illustrated. Cylinder 61 has a plurality of corrugations 62 formed circumferentially therein which permits its cylinder assembly 61 to extend longitudinally upon the addition of internal pressure, such as is shown in FIG. 6 when its piston is compressed.

A triple rate spring, in contrast to the dual rate springs of FIGS. 1-3, are shown in FIGS. 5, 6 and 7. There it is shown that the spring rates can be influenced still further by the modification of the chamber 61a to provide two chambers 68 and 69 which can be selectively used to provide triple spring rates. Referring first to FIGS. 5, 6, and 7 it will be noted that in FIGS. 5 and 6 there is a divider plate 67 threadably engaged on threads 66 of tube 65. The purpose of the threaded connection is to adjust the divider plate 67 along the tube 65 to modify resulting chambers 68 and 69 to the volume ratio as is desired. Communicating between chamber 68 and 69 as is shown in FIG. 7 is a stepped bore, 67b in plate 67 which has an impressed Borda's mouthpiece 70 held in by a snap ring 70c having the usual free-flow 98 percent orifice type of flow at 70a and sharp edged 70b for return which provides 60 percent flow in the opposite direction. The purpose of this particular divider plate 67 is so that on impact the entire volume of liquid 19 of the cylinders 61a is not available to the high spring rate excitation of the spring. The chamber 68 being a portion of the total volume in cylinder 61 causes a much sharper increase or increased spring rate on the initial impact. This higher spring resistance is modulated, depending on the velocity, by virtue of the bleed off flow through orifice 70. In effect as the spring hits the top of the sine wave, the compressed liquid in chamber 68 and 69 is in effect one volume thus providing a high spring rate similar to what was previously determined, but the resistance on initial impact was substantially greater on high velocity impact of the piston rod 31.

In FIG. 8, a liquid spring 80 having a plastic cylinder 81 wound with a plastic monofilament 89 is shown. Such a liquid spring is used for the purpose of limited plastic creep while simultaneously permitting deflection of the wall below the plastic creep limit. Preferably monofilament 89 is prestressed so as to place cylinder 81 in a prestressed wound condition thus doubling the creep stress limits. This liquid spring is intended to be used in vehicles or trains as antipitch or roll springs. Referring to FIG. 8A the separate chamber 78 is formed between outer tube 76 and piston tube 75 which has an upstanding base 75a for sealed engagement with tube 76 and shoulder 88a. Orifices 79 of retainer 88 are in communication only with extra chamber 78. In effect, pressure is equalized in chamber 76a and 76b by virtue of slight weeping past enlarged spring piston head 72 as it is pressurized. On sudden impact chamber 78 is relieved of pressure through orifice 79 to fill the annular chamber 76a. On rebound or extension the liquid is exhausted through orifice 79 dampening rebound, but chamber 78 being closed gets progressively stiffer as a spring, from energizing by annular piston area 72a, effectively lessening the spring rate after the spring passes support height as is shown at curve EL in FIG. 10. Curve CL being the impact or higher spring resistance and curve RL being the extension as resisted by the rebound control through orifice 79. The shaded area over line RL representing the only dampening to occur on the sine wave of spring 80. This minimum energy loss prevents heat destroying spring 80 at train velocities. Spring 80 works to reduce pitch or roll since it adds resistance on one side of a train truck in compression curve CL while simultaneously the spring on the other side is reduced on extension RL to normal position and then further as shown in curve EL on roll thus resisting and reducing the roll inputs from the spring system.

When used for pitch control on an accelerating or braking vehicles the liquid spring reacts against unusual displacement in the same manner as for roll. To accommodate the side play in a train truck, the assembly of tube 75-56 is permitted to float, since it has a closed end 75c. The tube assembly 75-56 has shoulder 75b retaining an elastomeric member 94. Member 94 holds tube 75-56 central but permits the tube assembly 75-56 to oscillate in the cylinder as the train truck lateral movement imparts side loads to cap 83 as the train rocks. Seal 93 being capable of the extent of misalignment as may occur in rail truck operation, because of its angular surface 93a.

Another manner in which this train roll can be reduced is to have the extended length of the spring 80 no greater than the loaded support height of the freight car, since it is not needed on a low CG (empty car). Thus the liquid springs 80 extends against its preload stop positioned to the loaded support height of the freight car and is inoperative when empty. When loaded, it operates on compression but on extension to the stop, it supplies no further energy to the roll. Meanwhile the spring on the other side of the truck increased its resistance on compression. In combination freight car roll is reduced.

FIGS. 8 and 8A also shows in detail a slightly different construction to provide a triple rate spring, in that the tube 75 has an external sealed larger tube 76 thereon, sealed at shoulders 75a and 88a on both extremities of tube 75. The purpose of the chamber 78 formed herein is to provide on opposing sides of enlarged piston head 72, a large chamber volume 78a and a small chamber 78 formed between tube 76 and 75 and yet a third chamber 76a the chamber behind the dashpot shown in the previous illustrations. Chamber 76a functions in the same manner as the previous chambers 26a and liquid 97 flows out and in the orifice 79 into the extra outer sealed chamber 78. However, since the outer chamber 78 is completely separated from chamber 78a, a gradual but more substantial buildup in the resisting spring force due to the volume in 78a is accomplished as the piston head 72 is accelerated on extension. Thus in this construction, we actually have two opposing springs on impact and extension and actually derive three spring rates or variations thereof.

On impact the liquid in chamber 78a is acted upon by enlarged head 72 except insofar as it is modulated by liquid entering 76a from chamber 78. However, when 76a fills completely from chamber 78 at the apex of the sine wave, the same differential spring situation can be achieved, since enlarged head 72 has been effectively sealed and weepage being negligible on the sudden reactions of the respective components and volumes. On extension, therefore, the liquid in chamber 76a is caused to enter chamber 78 through rebound dampening orifice 79 which being closed is building up a spring rate due to volume reduction which eventually will balance the spring force of head 72 from the annular piston area 72a and chamber 78 completely. The forces thus exerted by the piston 80a has many applications for tension-compression applications on either side of a support or rest position, and effectively provides a triple spring rate by the relative operations of the relative parts and chambers. Sealing divider plate 67 of FIGS. 5 and 6 would provide a similar spring with a triple chamber spring similar to FIG. 8. Such an arrangement is shown in FIG. 9. The advantages of the double tubular construction of FIG. 8 is that the triple spring rate situation can be provided without excessive pressure being exerted on the seal 93 from the downward pressure against the divider plate 67 on compression of the unit of FIGS. 5 or 6 or 107 of FIG. 9.

It should be noted that in all of the devices of FIG. 1 through 9 and in all instances no matter how fast the velocity of the piston and piston head travels in its respective bore, the maximum pressure or force that can be exerted is the ration of the total volume of the liquid in the liquid spring and the displacement of the piston head as a percentage of compressibility. Under no circumstances can the force be exceeded by the pressure times the enlarged piston head area, since force is not depending on the metered flow of liquid through a valve or pressure responsive valve, but rather on the displacement of the piston in relation to the total contained volume as in a standard liquid spring. This feature of this invention is called "limit load" in that no matter how fast the piston has traveled beyond the rated velocity a load limit force will not be exceeded. This is a desirable feature of this device when it is used for such things as crane and train buffers and suspensions. The usual conditions such as an empty crane in a runaway situation can still be stopped by this device provided its energy output does not exceed the limit load capabilities of the liquid spring without exceeding the load of the crane. Conversely, referring to FIG. 8, it is possible to exert a hydraulic bottoming of the devices shown in FIGS. 8 and 9 where hole 87 on inner-tube 75 is so located that piston head 72 can bypass the holes 87 trapping liquid in chamber 75d the compressible medium therein effectively providing hydraulic bottoming.

Referring to FIG. 9, an external metal cylinder 99 is shown having a restraining lip 99a and a threaded restraint collar 99b to support plastic cylinder 101 against creep. Restraint collar 99b is sealed to metal cylinder 99 at 101a and 101b so as to form a pressurizing chamber 102 therebetween for the purpose of raising or leveling the vehicle supported by this suspension through the introduction of a pressurizing liquid or gas to chamber 102 from a pump source at 103. It should be noted that the clearance provided by chamber 102 is so provided that yield of wall 101c until it touches cylinder 99 is below the deflection at which plastic creep can occur. It will thus be noted that plastic deformation is supported within the creep limits so that it cannot occur, while simultaneously providing means for leveling the suspension. Accordingly, means are provided for supplementing the spring load for thermal or load considerations.

In FIG. 11, a portion of this piston rod 31 and seal gland 23 in an enlarged detail view are illustrated to show the technique utilized to reduce the hysteresis of a spring device to a limit acceptable for vehicle suspensions. In FIG. 11 piston 31 is preferable a metal capable of acquiring a porous surface thereon such as stainless steel, aluminum, anodized aluminum, etc. It has even been found that rust or iron oxide on ordinary cast iron or steel rods acts as a fine retention surface for retaining deposited TFE. Unlike previous superfinished pistons a rough surface of 8μ seems to provide the best base surface with oxide applied thereafter. For instance, the piston 31 shows a rough oxide surface 31a in a nature of two millionths of a base metal roughness up to 8 millionths which has been either formed by various oxide producing processes such as anodizing, heating, etc., or has been allowed to form by exposure of the piston to heat so as to cause the surface to rapidly form an oxide coating. In this case a 17-4 stainless piston is used and by elevated temperature or passivating a surface of chrome or nickel oxide is formed. Through the utilization of mechanical rubbing procedures although some spray processes may also be used, TFE is caused to enter the surface roughness and oxide porosity. A TFE or plastic coating 31b is caused to fill up the rough surface and porosity of oxide coating 31a so that in effect when the spring is operated the surface 31b operating on the TFE oriented seal 23 provides the operation of TFE on TFE. It has been found that the rod so treated will resist greatly the passage of liquid 19 and will further cause said relative parts to operate at essentially frictionless levels. In practice it is 50 percent of the friction of an untreated rod. Various coats of TFE have been applied to piston rods with various TFE sprays mechanically by using a bar or tape against the rapidly rotating shaft 31 which causes the TFE to form in the roughness and oxide coating and provides the desired frictionless surface. It has been found that through this process the liquid spring for vehicle suspensions can be acceptable with low enough hysteresis or friction for use on passenger cars. The process reduces the friction of say 50 pounds to under 20 and most instances simultaneously provides a resulting surface for exceptional sealing of the nature required since most liquids will not pass two mated TFE surfaces since their surface tension is so low. In addition, heat is reduced so it does not raise the suspension or destroy the spring. The integral seal-cap 44 of FIG. 4D also provides a TFE surface because fibers 43k bleed out base acetal plastic 431 supplying such a TFE surface. A rough oxide coated rod, in fact, is much cheaper than previous superfinished rods for liquid springs.

Referring now to FIGS. 12 and 13, a long spring 110 which gets its volume relationships with a long body rather than a large diameter outside reservoir of the previous views is illustrated. This device is suitable for use on freight cars as the center sill suchioner since length can be a substantial portion of the length of the freight car. Such a long spring is characterized by very low costs since a closed end cold extruded aluminum cylinder 111 can be fabricated cheaply and in this version a center tube is not required. In this configuration, the relation of the volumes is obtained by length so that only the equivalent of a center tube is required with the volume obtained by extending its length. A piston member 120 is characterized by an enlargement 121 which stops on end cap 122 to retain the piston in a partly compressed position thus forming the chamber 126 behind the piston head. An enlarged head 132 acts as the high spring rate piston. FIG. 13 illustrates in enlarged section this head construction. Orifices 129 are now formed in the piston head 132 and yet provide the fluid amplifier principles since the piston traveling rapidly down bore 126 will cause a starvation through annular orifice 128 on the exhaust side of the orifices 129 as discussed previously. On reversal compression of the liquid molecules will cause the resistance to rebound because of orifice 128 and orifices 129. It should be noted that in the devices of FIGS. 1 through 10 and as illustrated well in FIGS. 3-3A, the clearance at orifice 28b to get flow is quite substantial, since flow tends to vary and to increase with eccentricity in such a clearance and the yield of plastic seal 23 can permit this eccentricity. The piston oriented orifices 129 and clearance 128 of FIG. 13 avoid this eccentricity since clearance at 128 is held by bearing of seal 130. Similarly, it is intended that piston head 32 of FIG. 1 through 3A could be so made with orifices 29 thus eliminated.

Valve assembly 140 is threadably held in piston head 132 by seal plug 141 which acts to adjust setting and as a valve 140 retainer. Poppet valve 142 seats on retainer 141 and is biased against pressure by spring 143. If temperature reduces flow through orifices 129 so that pressure surges are developed, poppet valve 142 will open bleeding off vernier amounts of liquid through passage 144 to chamber 126 to assure a 500,000 pound peak shock force under all temperature or velocity situations.

In FIG. 14, the curve LG, which is the low rate of "G" application so necessary for loose loading in box cars is illustrated. This curve LG is predetermined by enlarged head 132 displacement as a percentage of total volume and is essentially a spring curve. At point P the velocity has decelerated to where orifices 129 prevent further buildup. However, as deceleration continues according to $E=MV^2$ the increased viscosity of liquid 19 plus the diminishing molecular attraction of the liquid at orifice 128 due to piston velocity reduction provides essentially a flat topped curve LL. This ideal curve will be obtained at some velocity, e.g., 14 m.p.h. Curve S is, of course, the liquid spring return force. These curves represent actual oscilloscope traces in actual prototype tests.

Figure 16:
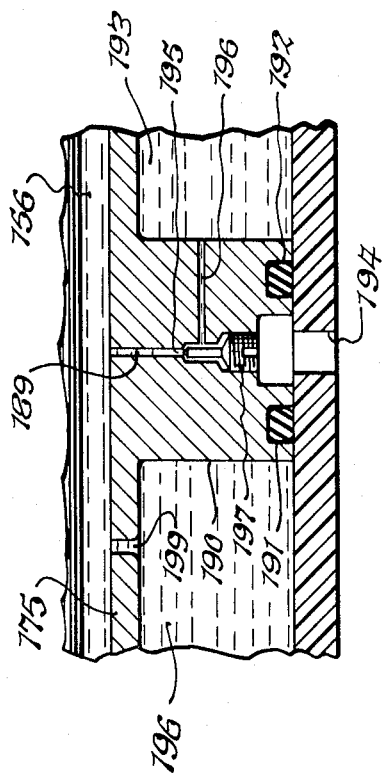
FIG. 16 is an enlarged cross-sectional view of a portion of the shock absorber illustrated in FIG. 16 showing in particular the external adjustment characteristics of the shock absorber.

In FIGS. 15 and 16 further modifications of this liquid spring 150 are illustrated. These springs are intended for industrial purposes where adjustments are required but which can also be utilized for purposes of adjusting vehicle suspension ride as well if desired. All the features of previously described devices are utilized except that the divider plate 100 provides chambers 193, 196 and has a double seal groove 191 and 192 effectively sealing off liquid in chambers 193 and 196. Divider 190 has a cylinder orifice 189 with an external adjustment hole 194 which is large enough to permit the passage of a screw driver for adjusting the metering orifice 195 by adjustment needle 197 and the flow-through bore 196 so it can modulate the amount of pressure reduction in chamber 156 and the dashpot head 157 so as to cause variation of limit and load between that desired. In other words, a means is provided for adjusting the energy capabilities of a liquid spring shock of the character noted by the simple expedient of modulating the amount of liquid that can go behind the dashpot enlarged piston head 157. While not illustrated here, it should be perfectly obvious that a pressure responsive valve located where screw adjustment 197 is located can be used to provide an exact pressure behind the enlarged head of a prescribed reduction whereby the spring rate as the device is compressed can be provided with a dual rate of an exacting nature.

An additional orifice hole 199 spaced down the tube 175 between exit bore 177 and bore 189 acts to limit rebound as the piston head 157 as it extends beyond orifice 199.

I claim:

1. An energy storage device comprising:
   a. an elastically deformable cylinder means,
   b. an inner pressure tube centrally disposed within said cylinder means,
   c. piston means extending into said cylinder means and slidably disposed within said inner pressure tube,
   d. compressible liquid normally filling said cylinder means in surrounding relationship and in communication with said piston means,
   e. aperture means formed in said inner pressure tube for limiting the flow of compressible liquid between said cylinder means and said inner pressure tube, and
   f. said compressible liquid having a substantial coefficient of thermal expansion and said cylinder means having a coefficient of thermal expansion related to that of said compressible liquid.

2. The device of claim 1 further characterized in that:
   a. said piston means is movable in said inner pressure tube past said aperture means to amplify the flow of fluid through said aperture means to said tube in the area of said smaller piston section whereby energy is stored.

3. The device of claim 1 further characterized in that:
   a. said cylinder is constructed of a material wherein it has substantial elastic deformation capability so that it deforms radially and acts as a spring seeking return to its normal configuration to provide at least 10 percent of the stored energy of said device.

4. The device of claim 1 further characterized in that:
   a. said cylinder is constructed of a material wherein it has substantial elastic deformation capability so that it deforms radially and acts as a spring seeking return to its normal configuration to provide at least 50 percent of the stored energy of said device.

5. The energy storage device of claim 1 further characterized by and including:
   a. means heating said liquid and said cylinder means to control the energy storage capabilities of said device mounted within said cylinder means.

* * * * *